United States Patent
Ramesh

(10) Patent No.: US 9,141,632 B1
(45) Date of Patent: Sep. 22, 2015

(54) SELECTING A COMPRESSION TECHNIQUE

(71) Applicant: Bhashyam Ramesh, Secunderabad (IN)

(72) Inventor: Bhashyam Ramesh, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 344 days.

(21) Appl. No.: 13/719,390

(22) Filed: Dec. 19, 2012

(51) Int. Cl.
*G06F 17/30* (2006.01)

(52) U.S. Cl.
CPC .... *G06F 17/30153* (2013.01); *G06F 17/30091* (2013.01)

(58) Field of Classification Search
CPC .............. G06F 17/30153; G06F 17/30091
USPC ....................................................... 707/693
See application file for complete search history.

(56) References Cited

U.S. PATENT DOCUMENTS

| | | | |
|---|---|---|---|
| 6,415,295 B1 * | 7/2002 | Feinberg ................................. | 1/1 |
| 8,686,881 B1 * | 4/2014 | Harnik et al. .................... | 341/87 |
| 2002/0073429 A1 * | 6/2002 | Beane et al. ................... | 725/105 |
| 2003/0145323 A1 * | 7/2003 | Hendricks et al. .............. | 725/34 |
| 2004/0069118 A1 * | 4/2004 | Okazaki et al. ................. | 84/603 |
| 2006/0230291 A1 * | 10/2006 | Burtscher ....................... | 713/188 |
| 2007/0053513 A1 * | 3/2007 | Hoffberg ....................... | 380/201 |
| 2008/0062270 A1 * | 3/2008 | Lawson ...................... | 348/220.1 |
| 2008/0071748 A1 * | 3/2008 | Wroblewski et al. ............. | 707/3 |
| 2010/0185588 A1 * | 7/2010 | Grigorian ...................... | 707/661 |
| 2012/0078961 A1 * | 3/2012 | Goenka .......................... | 707/778 |
| 2012/0284239 A1 * | 11/2012 | Agarwala et al. ............. | 707/693 |
| 2012/0290189 A1 * | 11/2012 | Davis ............................ | 701/102 |
| 2013/0024433 A1 * | 1/2013 | Amit et al. ..................... | 707/693 |
| 2013/0179410 A1 * | 7/2013 | Amit et al. ..................... | 707/693 |

* cited by examiner

*Primary Examiner* — Pierre Vital
*Assistant Examiner* — Nargis Sultana
(74) *Attorney, Agent, or Firm* — Howard Speight, PLLC

(57) ABSTRACT

Demographics for data are determined. A compression ratio ("CR") is determined for each of a plurality of compression techniques. CR is a size of the data before compression divided into a predicted size of the data after compression. The predicted size of the data after compression is determined as a function of the determined demographics. An access efficiency of each of the compression techniques is determined as a function of the determined demographics. The compression techniques are ranked by CR and access efficiency. A compression technique is selected based on the ranking. The data is compressed using the selected compression technique. The compressed data is stored.

18 Claims, 3 Drawing Sheets

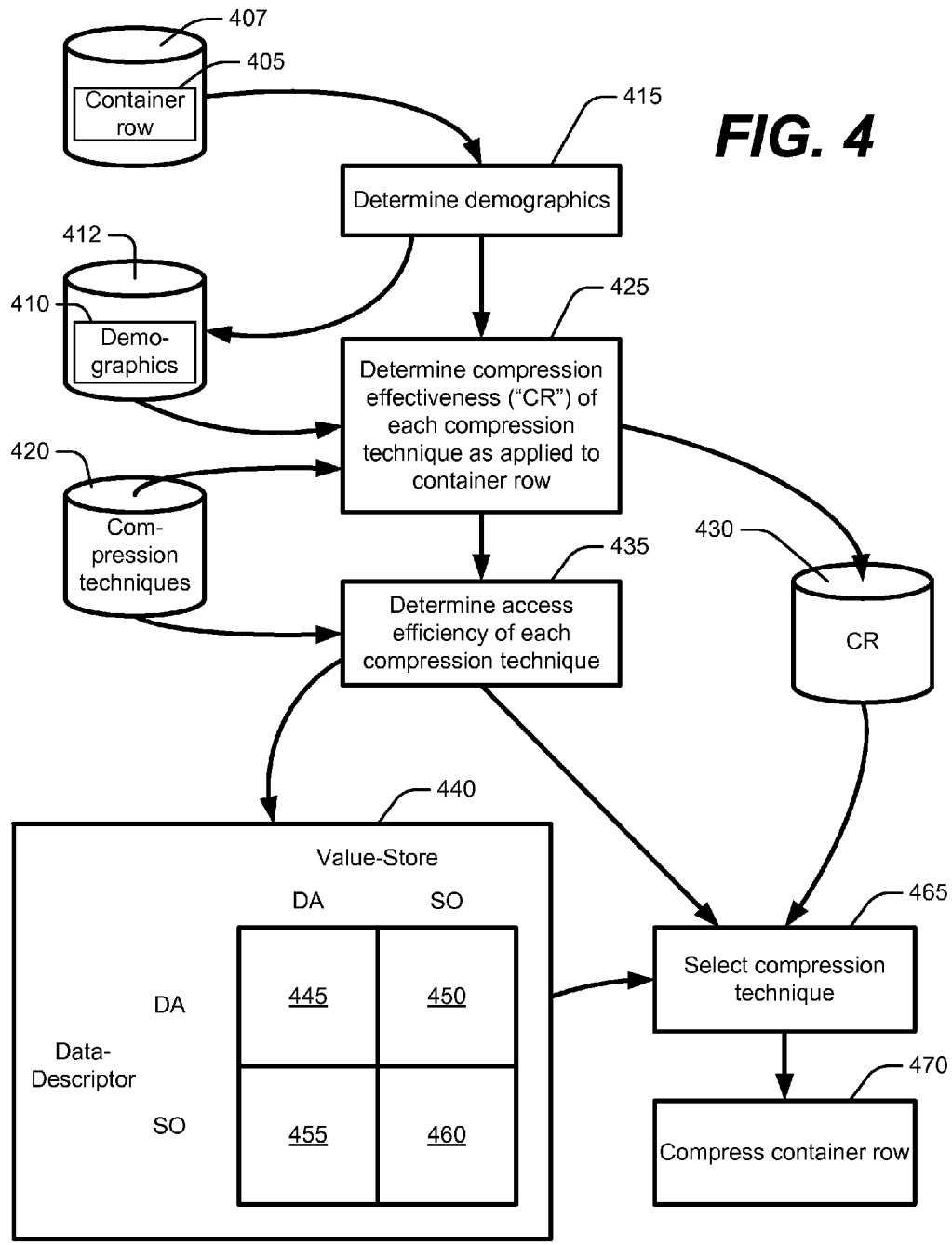

SELECTING A COMPRESSION TECHNIQUE

BACKGROUND

The literature lists many standalone compression techniques such as value list compression, run length encoding, Trim length encoding, NULL compression, UTF-8 compression, and Delta compression. Each of these has variants. For example, a trimmed value can be expressed using either the number of bytes remaining or the number of bytes trimmed.

It is possible to combine standalone techniques to form complex combined techniques. For example, value list and run length can be combined with trim to compress a "container row" (which is the terminology TERADATA® Corporation uses for what is conventionally referred to as a "columnar row"). Data in a container row is serialized (i.e., converted from a n-dimensional table configuration to a one-dimensional configuration suitable for storage in a computer memory) by column instead of by row. As a result, a container row is more likely to have data of a single type (e.g., integer, character, etc.), making compression simpler in some cases. A container row may contain multiple columns and multiple data types. Even in that case, though, compression of container rows is likely to be simpler than compressing of row because the number of data types subject to compression is likely to be fewer.

It is possible to stack standalone compression techniques and/or combined standalone compression techniques. Standalone techniques and their combinations with user specified techniques can be stacked to compress a container row. For example, value list and run length can be combined with trim or user specified table value list compression can be combined with value list or with value list and run length.

The above mentioned standalone techniques, their combinations, and further combinations with user specified techniques creates a large number of possible ways to compress a container row. Selecting a technique from among this large space of possibilities is a challenge.

SUMMARY

In general, in one aspect, the invention features a method. The method includes determining demographics for data. The method further includes determining a compression ratio ("CR") of each of a plurality of compression techniques, wherein CR is a size of the data before compression divided into a predicted size of the data after compression, wherein the predicted size of the data after compression is determined as a function of the determined demographics. The method further includes determining an access efficiency of each of the compression techniques as a function of the determined demographics. The method further includes ranking the compression techniques by CR and access efficiency. The method further includes selecting a compression technique based on the ranking. The method further includes compressing the data using the selected compression technique. The method further includes storing the compressed data.

Implementations of the invention may include one or more of the following. Each of the plurality of compression techniques may store data using an information data structure that specifies information about the data. Each of the plurality of compression techniques may store data using a value data structure that stores the values of the data. Access efficiency may be defined to have four categories. A first category may include the information data structure being accessed directly, and the value data structure being accessed directly. A second category may include the information data structure being accessed directly, and the value data structure being accessed sequentially. A third category may include the information data structure being accessed sequentially, and the value data structure being accessed directly. A fourth category may include the information data structure being accessed sequentially, and the value data structure being accessed sequentially. The first category may be ranked higher than the other categories. the second and third categories may be ranked equally. The fourth category may be ranked lower than the other categories. Ranking the compression techniques by CR and access efficiency may include assigning each of the plurality of compression techniques to one of the access efficiency categories by information data structure access technique and value data structure access technique and ranking the compression techniques within each category by CR. Selecting a compression technique based on the ranking may include selecting the highest-ranked compression technique within each category, ranking the selected compression techniques by category and CR, and selecting the highest-ranked compression technique. Ranking the selected compression techniques by category and CR may include adjusting the CR associated with a first category by a preference amount when comparing it with the CR of a second category. Access efficiency may be defined to have additional categories depending on the data type of the data in the value store and the access technique for the value data store for the compression technique being categorized. Access efficiency may be defined to have categories depending on the data type of the data in the value store and how the compression technique being categorized represents the data of the data type.

In general, in another, the invention features a database system. The database system includes one or more nodes. The database system includes a plurality of CPUs. Each of the one or more nodes provides access to one or more CPUs. The database system includes a plurality of virtual processes. Each of the one or more CPUs provides access to one or more virtual processes. Each virtual process is configured to manage data, including rows from the set of database table rows, stored in one of a plurality of data-storage facilities. The database system includes a process. The process determines demographics for data. The process determines a compression ratio ("CR") of each of a plurality of compression techniques. CR is a size of the data before compression divided into a predicted size of the data after compression. The predicted size of the data after compression is determined as a function of the determined demographics. The process determines an access efficiency of each of the compression techniques as a function of the determined demographics. The process ranks the compression techniques by CR and access efficiency. The process selects a compression technique based on the ranking. The process compresses the data using the selected compression technique. The process stores the compressed data.

In general, in another aspect, the invention features a computer program stored in a non-transitory computer readable storage medium. The program includes executable instructions that cause a computer to determine demographics for data. The program includes executable instructions that cause the computer to determine a compression ratio ("CR") of each of a plurality of compression techniques. CR is a size of the data before compression divided into a predicted size of the data after compression. The predicted size of the data after compression is determined as a function of the determined demographics. The program includes executable instructions that cause the computer to determine an access efficiency of each of the compression techniques as a function of the determined demographics. The program includes executable instructions that cause the computer to rank the compression techniques by CR and access efficiency. The program includes executable instructions that cause the computer to select a compression technique based on the ranking. The program includes executable instructions that cause the computer to compress the data using the selected compression technique. The program includes executable instructions that cause the computer to store the compressed data.

BRIEF DESCRIPTION OF THE DRAWINGS

FIG. 4 is a flow chart.

DETAILED DESCRIPTION

Figure 1:
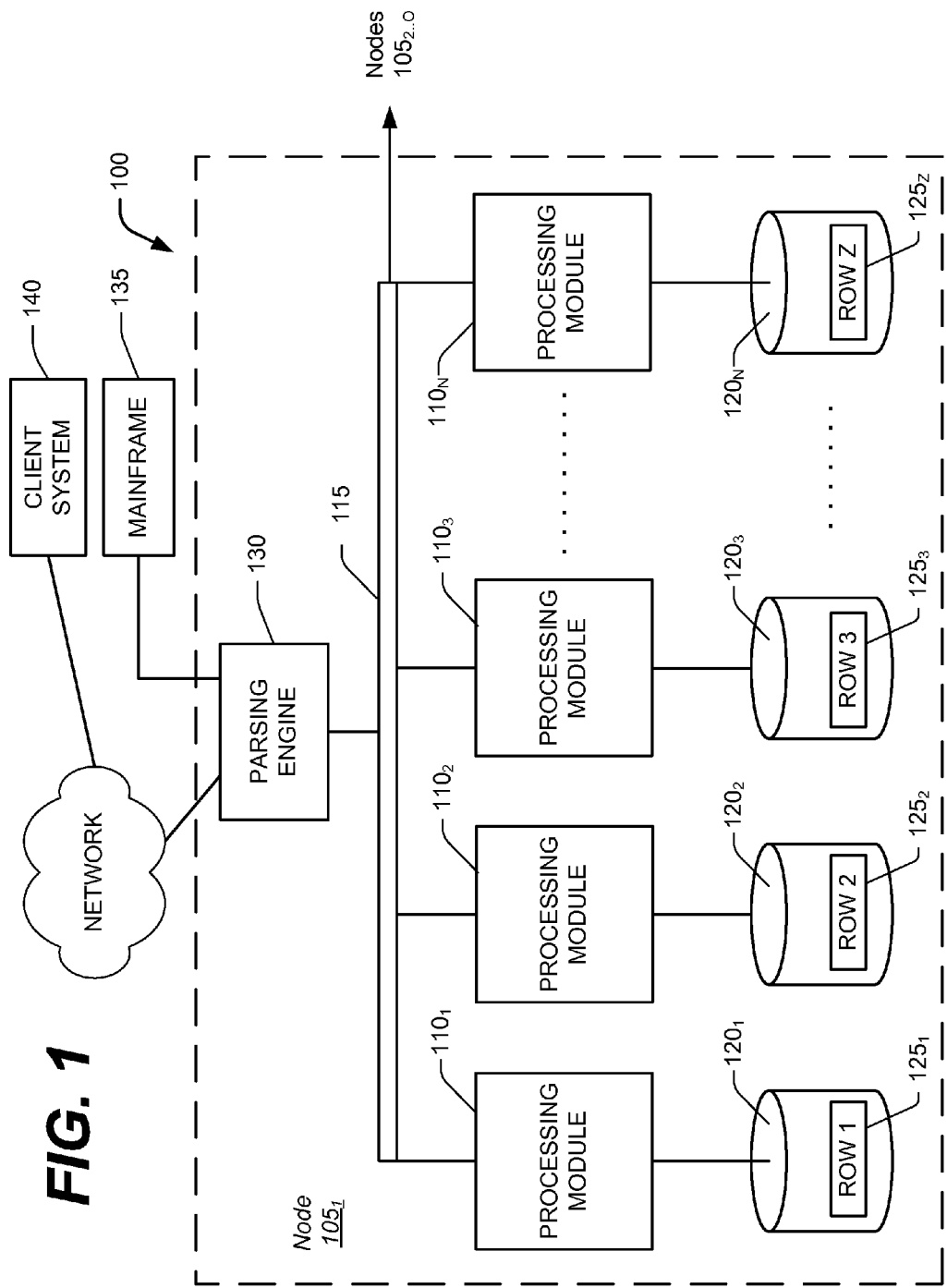
FIG. 1 is one example of a block diagram of a node of a database system.

The compression selection technique disclosed herein has particular application, but is not limited, to large databases that might contain many millions or billions of records managed by a database system ("DBS") 100, such as a Teradata Active Data Warehousing System available from the assignee hereof. FIG. 1 shows sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
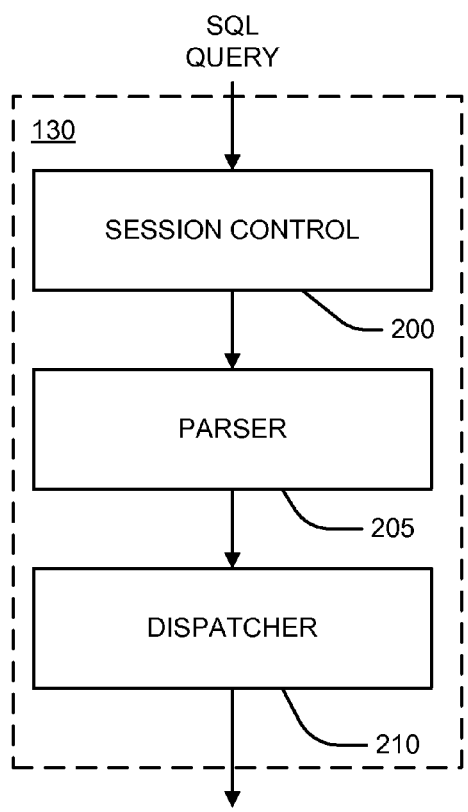
FIG. 2 is one example of a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
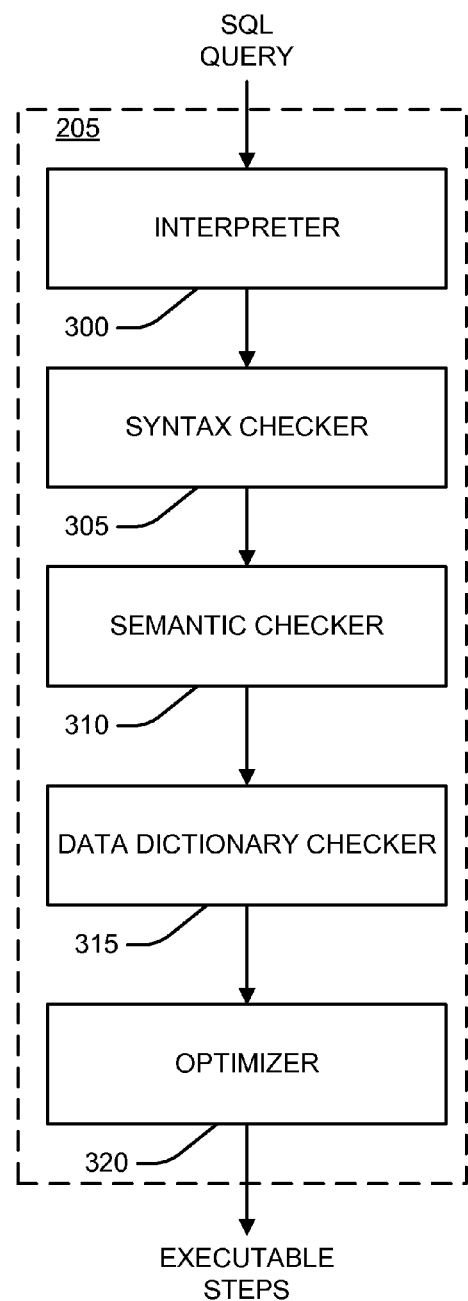
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

In one embodiment, shown in FIG. 4, a container row 405 to be compressed, that is part of a data set 407, is analyzed to determine the demographics 410 represented in the container row 405 (block 415). In one embodiment, this analysis makes a single pass of the container row 405 and collects and saves the container row demographics 410 in a data store 412, perhaps with the demographics of other container rows. In one embodiment, the container row demographics 410 include some or all of the following data about the container row: maximum value, minimum value, average value, maximum (minimum and average) number of occurrences of a value, maximum (minimum and average) run group length, maximum (minimum and average) size of a value, number of rows represented in the container row, number of NULLs, among others. Not all of these demographics apply for each data type. For example, average value is not meaningful for variable size character data types.

In one embodiment, the container row demographics 410 are used with each possible compression technique 420 to determine the extent to which each compression technique can provide compression (block 425), which is the compression effectiveness of the technique and is referred to herein as "compression ratio" (or "CR"). In one embodiment, CR is calculated by dividing the size of the container row 405 before compression into a predicted size of the container row 405 after compression. In one embodiment, the predicted size of the container row 405 after compression is determined as a function of the determined demographics 410. In one embodiment, CR is calculated by dividing the data to which the container row 405 belongs before compression into a predicted size of the data to which the container row 405 belongs after compression. The CR are stored in data store 430.

In one embodiment, goals of compression technique selection are to:
1. compress for size alone, and
2. compress for size and access efficiency.

In one embodiment, the first goal achieves maximum CR. This means the compression technique is chosen for its CR and therefore optimizes disk input/output ("IO").

In one embodiment, the second goal optimizes for a combination of disk IO and data access. "Data access" is defined as the ability to find a data element efficiently. Efficient data access also refers to the ability to insert compressed values efficiently because inserting a value into a compressed container row requires searching. Depending on the compression technique different ways may exist to search a container row. For example, in one embodiment, searching determines if the value to be inserted is already present in the container row, either in the dictionary or in the container row, or is the last value inserted into the container row. In one embodiment, searching is also used when the row is accessed in a random manner during queries.

The goal of compressing for size or disk IO alone is a common goal in managing data. Such a goal may be appropriate in configurations that are disk IO deficient. It may also be appropriate for cold data, i.e., data that is seldom accessed. Compressing for size and disk IO alone is also relatively easy to implement. In one embodiment, selecting the technique with the best expected CR will achieve this goal.

In one embodiment, the second goal of compressing for size and access efficiency is appropriate for hot data, i.e., data that is frequently accessed, among other sets of data.

In one embodiment, selecting a compression technique in order to satisfy the second goal (compressing for disk IO and efficiency of access) is challenging, requiring a way to assess access efficiency and to specify the tradeoff between disk IO savings and access efficiency.

A discussion of access efficiency is useful at this point. In one embodiment, implementations that store data in a container row or its equivalent have at least two list-like structures—one to specify the information for each row in the data base (an "information data structure") and one to store the values in the row (a "value data structure").

For example, in one embodiment, in a container row that is compressed using value list compression, the first list or structure contains entries for each value in the container row. In one embodiment, in a data base application this means it contains an entry for each row in the table. In one embodiment, this entry specifies the value of the row for the one or more columns spanned by the container row. In one embodiment, the entry can be a value, it can be NULL, or it can be a pointer to a value in the dictionary. In one embodiment, the dictionary is the second list or structure. In one embodiment, the dictionary is stored as part of the container row. In one embodiment, the dictionary contains unique values. So, for example, if the container row represents 10000 values or 10000 rows then the first list will have 10000 entries. If there are only 10 unique values in this list of 10000 values or rows then the second list will have 10 entries—one for each unique value. Hereinafter, the first list is referred to as data-descriptor and second as value-store.

In one embodiment, access efficiency is measured by characterizing how each of these two structures is accessed, i.e., whether the access is sequential or direct. Note that, in one embodiment, access efficiency includes the ability to read and evaluate a value. In one embodiment, access efficiency also includes the ability to search a value when storing a new value. In one embodiment, both aspects of access efficiency are best when the lists within the container row are accessed directly. Access efficiency degrades when either of the lists is accessed sequentially. Both aspects of access efficiency are worst when both lists are accessed sequentially.

In one embodiment, to address the second goal, access efficiency is combined with CR to select the compression scheme. In one embodiment, when choosing between two techniques that provide same CR, the one with better access efficiency is preferred.

In one embodiment, choosing between two techniques in which one has somewhat better CR and the other has somewhat better access efficiency is challenging. In one embodiment, the compression techniques are determined (block 435) to be in one of four categories of access efficiency (illustrated in FIG. 4 by chart 440), i.e., both lists are direct accessed ("DA") 445, sequential only ("SO") on value-store 450, sequential only on data descriptor 455, sequential on both data descriptor and value-store 460.

In one embodiment, the categories specify how each of the lists is accessed. In one embodiment, each compression technique is determined to be in one of the four categories. In one embodiment, the number of lists is greater than two and the number of access efficiency categories increases accordingly. For example, in one embodiment, when there are N lists, there are N×N access efficiency categories.

In one embodiment, the compression technique is selected using the CR and access efficiency information (block 465). In one embodiment, techniques within each category 445, 450, 455, and 460 are compared based solely on their CR and the technique with the best CR wins. If there is a tie, the selection is based on heuristics—the choice is based on a subjective understanding of the techniques. In one embodiment, the result is one "winning" technique from each category 445, 450, 455, and 460.

In one embodiment, the "winning" techniques are then compared and a compression technique is selected (block 465). In one embodiment, a technique with poorer access efficiency is preferred over a technique with superior access efficiency only if its CR is "compelling." In one embodiment, the extent to which CR should be compelling is tunable and differs between categories. In one embodiment, a compression technique with a lower (or poorer) access efficiency is preferred over a compression technique with a higher (or superior) access efficiency if the size benefit from the former compression technique exceeds a "preference amount," such as 25% (i.e., if the CR for the lower access efficiency technique—the CR for the higher access efficiency technique >25%). In one embodiment, the worst access efficiency category techniques are preferred over the two intermediate category techniques if their size benefit from compression (CR) exceeds 10%. Other similar measures are possible. In one embodiment, the percentages are defined for the best access efficiency category instead of the worst.

In one embodiment, the categorization is based not only on the way the lists are accessed but also on the type of data that is being compressed. In one embodiment, the same compression technique may be categorized differently for a fixed length data type than for a variable length data type.

In one embodiment, the categorization of each compression technique depends upon the type of data that is being compressed by the compression technique and how the compression technique represents the data within a container row. For example, in one embodiment the compression technique is placed in one category if it represents data with values and in another category if it represents data with pointers.

In one embodiment, how the compression technique represents data within a container row determines how the two lists are accessed by the compression technique.

In one embodiment, the container row is compressed using the selected compression technique (block 470).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   determining demographics for data;
   determining a compression ratio ("CR") of each of a plurality of compression techniques, wherein CR is a size of the data before compression divided into a predicted size of the data after compression, wherein the predicted size of the data after compression is determined as a function of the determined demographics;
   determining an access efficiency of each of the compression techniques as a function of the determined demographics;
   ranking the compression techniques by CR and access efficiency;
   selecting a compression technique based on the ranking;
   compressing the data using the selected compression technique; and
   storing the compressed data;
   wherein each of the plurality of compression techniques stores data using:
      a information data structure that specifies information about the data, and
      a value data structure that stores the values of the data;
   wherein access efficiency is defined to have four categories:
      a first category in which:
         the information data structure is accessed directly, and
         the value data structure is accessed directly,
      a second category in which:
         the information data structure is accessed directly, and
         the value data structure is accessed sequentially,
      a third category in which:
         the information data structure is accessed sequentially, and
         the value data structure is accessed directly, and
      a fourth category in which:
         the information data structure is accessed sequentially, and
         the value data structure is accessed sequentially.

2. The method of claim 1, wherein:
   the first category is ranked higher than the other categories,
   the second and third categories are ranked equally, and
   the fourth category is ranked lower than the other categories.

3. The method of claim 2 wherein ranking the compression techniques by CR and access efficiency comprises:
   assigning each of the plurality of compression techniques to one of the access efficiency categories by information data structure access technique and value data structure access technique; and
   ranking the compression techniques within each category by CR.

4. The method of claim 3 wherein selecting a compression technique based on the ranking comprises:
   selecting the highest-ranked compression technique within each category;
   ranking the selected compression techniques by category and CR; and
   selecting the highest-ranked compression technique.

5. The method of claim 4 wherein ranking the selected compression techniques by category and CR comprises:
   adjusting the CR associated with a first category by a preference amount when comparing it with the CR of a second category.

6. The method of claim 2 wherein:
   access efficiency is defined to have additional categories depending on:
      the data type of the data in the value store; and
      the access technique for the value data store for the compression technique being categorized.

7. A database system comprising:
   one or more nodes;
   a plurality of CPUs, each of the one or more nodes providing access to one or more CPUs;
   a plurality of virtual processes, each of the one or more CPUs providing access to one or more virtual processes;
   each virtual process configured to manage data, including rows from the set of database table rows, stored in one of a plurality of data-storage facilities;
   a process to:
      determine demographics for data;
      determine a compression ratio ("CR") of each of a plurality of compression techniques, wherein CR is a size of the data before compression divided into a predicted size of the data after compression, wherein the predicted size of the data after compression is determined as a function of the determined demographics;
      determine an access efficiency of each of the compression techniques as a function of the determined demographics;
      rank the compression techniques by CR and access efficiency;
      select a compression technique based on the ranking;
      compress the data using the selected compression technique; and
      store the compressed data;
   wherein each of the plurality of compression techniques stores data using:
      a information data structure that specifies information about the data, and
      a value data structure that stores the values of the data;
   wherein access efficiency is defined to have four categories:
      a first category in which:
         the information data structure is accessed directly, and
         the value data structure is accessed directly,
      a second category in which:
         the information data structure is accessed directly, and
         the value data structure is accessed sequentially,
      a third category in which:
         the information data structure is accessed sequentially, and
         the value data structure is accessed directly, and
      a fourth category in which:
         the information data structure is accessed sequentially, and
         the value data structure is accessed sequentially.

8. The database system of claim 7, wherein:
the first category is ranked higher than the other categories,
the second and third categories are ranked equally, and
the fourth category is ranked lower than the other categories.

9. The database system of claim 8 wherein ranking the compression techniques by CR and access efficiency comprises:
assigning each of the plurality of compression techniques to one of the access efficiency categories by information data structure access technique and value data structure access technique; and
ranking the compression techniques within each category by CR.

10. The database system of claim 9 wherein selecting a compression technique based on the ranking comprises:
selecting the highest-ranked compression technique within each category;
ranking the selected compression techniques by category and CR; and
selecting the highest-ranked compression technique.

11. The database system of claim 10 wherein ranking the selected compression techniques by category and CR comprises:
adjusting the CR associated with a first category by a preference amount when comparing it with the CR of a second category.

12. The database system of claim 8 wherein:
access efficiency is defined to have additional categories depending on:
the data type of the data in the value store; and
the access technique for the value data store for the compression technique being categorized.

13. A computer program stored in a non-transitory computer readable storage medium, the program comprising executable instructions that cause a computer to:
determine demographics for data;
determine a compression ratio ("CR") of each of a plurality of compression techniques,
wherein CR is a size of the data before compression divided into a predicted size of the data after compression, wherein the predicted size of the data after compression is determined as a function of the determined demographics;
determine an access efficiency of each of the compression techniques as a function of the determined demographics;
rank the compression techniques by CR and access efficiency;
select a compression technique based on the ranking;
compress the data using the selected compression technique; and
store the compressed data;
wherein each of the plurality of compression techniques stores data using:
a information data structure that specifies information about the data, and
a value data structure that stores the values of the data;
wherein access efficiency is defined to have four categories:
a first category in which:
the information data structure is accessed directly, and
the value data structure is accessed directly,
a second category in which:
the information data structure is accessed directly, and
the value data structure is accessed sequentially,
a third category in which:
the information data structure is accessed sequentially, and
the value data structure is accessed directly, and
a fourth category in which:
the information data structure is accessed sequentially, and
the value data structure is accessed sequentially.

14. The computer program of claim 13, wherein:
the first category is ranked higher than the other categories,
the second and third categories are ranked equally, and
the fourth category is ranked lower than the other categories.

15. The computer program of claim 14 wherein, when ranking the compression techniques by CR and access efficiency, the computer:
assigns each of the plurality of compression techniques to one of the access efficiency categories by information data structure access technique and value data structure access technique; and
ranks the compression techniques within each category by CR.

16. The computer program of claim 15 wherein, when selecting a compression technique based on the ranking, the computer:
selects the highest-ranked compression technique within each category;
ranks the selected compression techniques by category and CR; and
selects the highest-ranked compression technique.

17. The computer program of claim 16 wherein, when ranking the selected compression techniques by category and CR, the computer:
adjusts the CR associated with a first category by a preference amount when comparing it with the CR of a second category.

18. The computer program of claim 14 wherein:
access efficiency is defined to have additional categories depending on:
the data type of the data in the value store; and
the access technique for the value data store for the compression technique being categorized.

* * * * *